3,404,182
PROCESS FOR THE PREPARATION OF
CYCLOHEXANONEOXIME
Giuseppe Ribaldone, Gallarate, Varese, and Corrado
Brichta and Adriano Nenz, Milan, Italy, assignors,
by mesne assignments, to Montecatini Edison
S.p.A., Milan, Italy
No Drawing. Filed Apr. 10, 1963, Ser. No. 271,860
Claims priority, application Italy, Apr. 11, 1962,
7,150/62; Dec. 28, 1962, 25,490/62
4 Claims. (Cl. 260—566)

The present invention relates to a process for preparing cyclo-alkanone-oximes, and more particularly it relates to a process for preparing cyclo-alkanone-oximes by dehalogenating 2-halo-cyclo-alkanone-oximes and salts thereof.

It is known to dehalogenate 2-chloro-cyclo-alkanone-oximes by means of molecular hydrogen in the presence of hydrogenation catalysts, or by a series of reactions comprising an elimination of the hydrochloric acid by action of alkalies followed by hydrogenation of the unsaturated oximes thus obtained. However, the course of reaction of these known processes is unpredictable and in addition suffer from the disadvantage that hydrogenation of the oximic group occurs producing undesired hydrogenation products which do not contain an oximic group. Utilizing the known process, for example, the dehalogenate 2-chloro-cyclo-octanone-oxime results in the production of cyclo-octyl-amine and not cyclo-octanone-oxime.

An improved process for dehalogenation of 2-chloro-cyclo-hexanone-oxime is the subject of co-pending application S.N. 247,459 filed on Dec. 20, 1962 to Caprara et al., and assigned to the assignee of the present invention, and now abandoned, which comprises effecting dehalogenation utilizing molecular hydrogen in presence of a substance which eliminates the acidity caused by hydrochloric acid formed during the reaction. The elimination of acidity caused by formation of hydrochloric acid, substantially eliminates catalyst poisoning. While the foregoing invention has contributed greatly to the advancement of the art of dehalogenation of the subject compounds, the method leads to the obtainment of cyclohexanone-oxime but requires the presence of neutralizing agents and cannot be utilized successfully without additional and often complicated process steps comprising neutralization of the solidifying acid with supplementary neutralizing agent when it is desired to dehalogenate, for example, salts of 2-chloro-cyclo-alkanone-oximes.

It is therefore an object of this invention to provide a new, simple and practical method for the preparation of oximes of cycloalkanones which are readily useable as important intermediates in the synthesis of lactams and in turn which are of greater industrial interest in the production of, for example, films, fibres, moulding materials, etc.

Another object of the present invention is to provide a simple, practical and relatively inexpensive process for producing cyclo-alkanone-oximes of high purity in quantitative amounts.

A further object of the present invention is to provide a process for the dehalogenation of salts of 2-halogen-cyclo-alkanone-oxime which does not require supplementary preventive neutralization of the salifying acid.

Still another important object of this invention is to provide an improved process for obtaining cyclo-alkanone-oximes or salts thereof.

Another object by no means of less importance is the provision of a simple process of catalytically dehalogenating salified 2-chloro-cyclo-alkanone-oximes.

In accordance with the invention a new and improved process for the production of cyclo-alkanone-oximes of extremely high purity and yields from 2-halo-cyclo-alkanone-oximes which comprises reacting a 2-halo-cyclo-alkanone-oximes with a strong acid and molecular hydrogen in the presence of a hydrogenation catalyst. While the process according to the present invention may be carried out by dissolving the 2-halo-cyclo-alkanone-oxime starting material in a suitable solvent followed by the addition of a strong acid and molecular hydrogen in the presence of a hydrogenation catalyst, in the preferred embodiment the process may be carried out in a two step process by dissolving in a suitable solvent the 2-halo-cyclo-alkanone-oxime salified with the strong acid prior to hydrogenation, followed by the addition of molecular hydrogen in the presence of a hydrogenation catalyst.

By way of illustration only, the reactions evolved on the process of the invention may be schematically set out as follows:

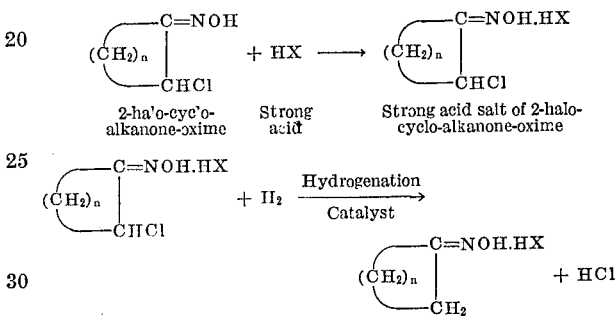

where $n$ represents a number from 3 to 10 and HX represents a strong acid.

It will be appreciated from the foregoing discussion and that following, that utilizing the process of this invention substantially little or no hydrogenation of the oximic group occurs.

By way of example of cyclo-alkanone-oximes which may be dehalogenated utilizing the process of this invention are, cycloaliphatic ketoximes which contain a halogen atom in the alpha position with respect to the ketoximic group; 2-halo-cycloaliphatic ketoximes substituted in the cyclo-aliphatic ring by, for example, alkyl groups such as methyl, ethyl, etc. and alkoxy groups such as methoxy, ethoxy, etc.; particularly 2-chloro-cyclohexanone-oxime, 2 - chloro - cyclo - octanone-oxime, 2-chloro-cyclo-dodecanone-oxime, and substitution products thereof.

Where it is desired to carry out the process of the invention in a two step process as discussed hereinabove, the strong acid 2-halo-cyclo-alkanone-oxime salt may be prepared using any of the known methods of preparing neutral salts which contain an equivalent of acid per mole of oxime, as well as polybasic acid salts of the oxime which comprise more than the equivalent of acid per mole of oxime. It will be further appreciated that when utilizing a two step synthesis, the strong acid salt of the 2-halo-cyclo-alkanone-oxime may be prepared in accordance with the process of our copending application S.N. 257,357 filed on Feb. 1, 1963 to Nenz et al., and now U.S. Patent No. 3,267,143 which comprises reacting nitrosyl-sulfuric acid and cyclo-olefins in the presence of hydrochloric acid.

According to the present invention the required quantity of strong acid is at least one equivalent per mole of 2-halo-cyclo-alkanone-oxime; it was unexpectedly discovered that the process of the invention may be carried out in the presence of great excess of the strong acid and that it does not interfere with the smooth course of the dehalogenation reaction.

As the strong acid used in the process of this invention, we have found suitable such mineral acids as sulfuric, hydrochloric, and phosphoric acids and organic acids as benzene-sulfonic, p-toluene sulfonic, to name a few.

The solvent used in the present invention may be any one of the commercially available compounds capable of dissolving the 2-halo-cyclo-alkanone-oxime and the strong acid salts thereof when used in a two system process. In the preferred embodiment a polar solvent is used, such as, for example, carboxylic acids, alcohols and methylene chloride. It is highly desirable, but not essential, that the solvent selected be of a character to provide homogeneity throughout the process. In the preferred embodiment the initial solution comprises 25–50% by weight of a 2-halo-alkanone-oxime starting material or salt thereof. However, concentrations lower or higher than these values are not all detrimental to the reaction.

While any suitable hydrogenation catalyst may be used, it is preferred to use a catalyst comprising one of the metals selected from the 8th group of the periodic system. It has been found that palladium is a suitable catalyst, selective both in the form of an alloy, oxide or salt, as well as, and preferably, in the form of a dispersion, variously supported, by, for example, activated carbon or barium sulphate.

It was surprisingly discovered that the process of the invention proceeds equally well at atmospheric pressure or under elevated pressure. In other words the pressure is not critical.

The process according to the invention, is preferably carried out at room temperature or temperatures which do not evaporate the solvent used, such as, for instance, temperatures between 0° C. and 70° C. depending on the solvent selected. It will be appreciated that the process of the invention may be adapted to batch or continuous techniques.

The cyclo-alkanone-oxime reaction product prepared in the process of this invention may be simply removed from the reaction mixture and purified per se in the form of salt of the strong acid used in the process, or a solution of the cyclo-alkanone-oxime in the strong acid. Where desired in the pure form, any of the conventional techniques of separation may be used, for example, neutralization of the acid solution by a suitable base followed by solvent extraction or vacuum distillation. In some instance a simple water dilution effects precipitation of the cyclo-alkanone-oxime. Where it is desired to obtain the produce in the form of the salt or a solution of the product in the strong acid, a selective solvent is used which is miscible with the reaction solvent and immiscible with the solution of the product in the strong acid or, where the salt is desired, it does not solve the same.

The following examples, are by way of illustration only, and it is to be understood that the invention is not limited to the techniques set forth therein.

EXAMPLE 1

A solution of 6.5 g. of 2-chloro-cyclo-pentanone-oxime and 2 g. of anhydrous hydrochloric acid in 100 cc. of glacial acetic acid was hydrogenated at room temperature and atmospheric pressure, in the presence of 1 g. of a catalyst containing 10% of Pd supported on carbon. Once the absorption of the quantity of hydrogen required by the reaction was completed, the solution was filtered from the catalyst and evaporated under a vacuum of 15 mm. Hg and with a bath at a temperature between 30–35° C.

The oily residue was neutralized at 0° C. by means of a solution saturated with sodium carbonate, and then repeatedly extracted with chloroform. After drying the chloroformic extracts over anhydrous sodium sulphate and after evaporation, a liquid residue of 4.5 g. was obtained which, after distillation under vacuum, yielded 3.7 g. of cyclopentanone-oxime having a boiling point of 75° C./8 mm. Hg, and melting point of 53–55° C. The I.R. band of the product turned out to be identical with that of the pure, cyclo-pentanone-oxime. The yield in distilled product was 76.8% of the theoretical value.

EXAMPLE 2

A solution of 17.2 g. of sulphate of 2-chloro-cyclohexanone-oxime in 172 cc. of glacial acetic acid was hydrogenated at room temperature and at atmospheric pressure in the presence of 1.72 g. of a catalyst containing 10% of Pd supported on activated carbon.

Once the absorption of the quantity of hydrogen required by the reaction was completed, the solution was filtered from the catalyst, evaporated under a vacuum of 15 mm. and with a bath at 30°–35° C. The oily residue was neutralized at 0° C. with a saturated solution of sodium carbonate and repeatedly extracted with chloroform. After drying the chloroformic extracts over an anhydrous sodium sulphate and after evaporation, a residue of 6.7 g. having a melting point of 84°–86° C. was obtained, consisting of cyclo-hexanone-oxime (yield 84.5%). After crystallization from petroleum ether, the substance melted at from 88°–89° C. also when mixed with a sample of pure cyclo-hexanone-oxime. The I.R. band of the product thus obtained turned out to be identical with that of the pure cyclo-hexanone-oxime.

EXAMPLE 3

50 g. of cyclohexene (0.61 mole) and 150 g. of cyclohexane were put into a 500 cc. round bottom flask fitted with a reflux cooler, a stirrer, a thermometer, an outer cooling bath and equipped with two separate inlets for HCl and nitrosyl-sulfuric acid. After having cooled the cyclohexane-cyclohexene mixture down to 0° C., the feed of nitrosyl-sulfuric acid—subdivided into minute crystals—was started with the aid of a whatever metering means for solids, and at the same time, a small current of gaseous HCl, metered in such a manner that a slight excess of HCl over the nitrosyl-sulfuric acid was always present, was also fed to flask.

Thus 60 g. of $NOHSO_4$ (0.47 mole) and about 20 g. of HCl (about 0.55 mole) were added within about 90 minutes to flask contents.

A whitish viscous oil separated itself in the course of the reaction which was slightly exothermic. After the addition of both reactants, the reaction mixture was vigorously stirred for further 30 minutes while maintaining the temperature at about 0° C. At the end of such operation the non-reacted cyclohexane and cyclohexene were removed by simply decanting them. After having removed the last traces of cyclohexane and cyclohexene by sucking under vacuum 113.5 g. of 2-chloro-cyclo-hexanone-oxime sulfate were obtained.

A solution of 29.4 g. of the thus obtained 2-chlorocyclohexanone-oxime sulfate in 100 cc. of glacial acetic acid was hydrogenated at room temperature and at an atmospheric pressure in the presence of 2.94 g. of a catalyst containing 10% of Pd supported on activated carbon. Once the absorption of the quantity of hydrogen required by the reaction was completed, the solution was filtered by the catalyst and stirred together with 250 cc. of petroleum ether.

The oily layer thus obtained was washed with some petroleum ether and then evaporated to free it of the last traces of acetic acid and petroleum ether at from 25°–30° C. and under a vacuum of 2 mm. 26.5 g. of thick oily product was thereby obtained, which was treated at 0° C. with a saturated solution of sodium carbonate until neutralization was reached. After repeated extractions with chloroform, drying over anhydrous sodium sulphate and removal of the solvent by evaporation, a crystalline residue of 11.6 g. of cyclo-hexanone-oxime having a melting point of 87° C. (yield 85.9%) was obtained.

Example 4

A solution of 17.2 g. of sulphate of the 2-chloro-cyclohexanone-oxime in 100 cc. of absolute ethanol was hydrogenated at room temperature and at atmospheric pressure in the presence of 0.3 g. of palladous chloride.

Following the extraction procedures described in Example 3, 6.2 g. of cyclo-hexanone-oxime having a M.P. of 87°–89° C. (yields of 85.5%) were obtained.

Example 5

A solution of 10.53 g. of 2-chloro-cyclo-hexanone-oxime and of 6.86 g. of sulphuric acid concentrated at 100% in 172 cc. of glacial acetic acid was hydrogenated at room temperature and at atmospheric pressure in the presence of 1.72 g. of a catalyst containing 10% of Pd supported on carbon. Following the extraction procedures of Example 3, 5.5 g. of cyclo-hexanone-oxime having a M.P. of 87–88° C. (yield=77%) were obtained.

Example 6

A solution of 17.2 g. of sulphate of the 2-chloro-cyclo-hexanone-oxime in 100 cc. of glacial acetic acid was hydrogenated in a shaking autoclave at 35°–40° C. and with an initial hydrogen pressure of 40 atm. in the presence of 1.72 g. of a catalyst containing 10% of Pd supported on activated carbon. After the pressure was decreased to a value corresponding to the quantity of hydrogen required by the reaction, the solution was discharged from the autoclave and from it was extracted the cyclo-hexanone-oxime according to the procedure described in Example 3.

Thereby 6.0 g. of cyclo-hexanone-oxime having a M.P. of 86°–88° C. (yields=75.8%) were obtained.

Example 7

A solution of 12.9 g. of hydrochloride of the 2-chloro-cyclo-hexanone-oxime (with a titre in 2-chloro-cyclo-hexanone-oxime of 77.5%) in 170 cc. of glacial acetic acid was hydrogenated at room temperature and at atmospheric pressure in the presence of 3.44 g. of a catalyst containing 5% of palladium (Pd) supported on barium sulphate.

Following the procedure described in Example 3, 6.4 g. of cyclo-hexanone-oxime having a M.P. of 87°–88° C. (yields=84%) were obtained.

Example 8

A solution of 7 g. of hydrochloride of 2-chloro-cyclo-hexanone-oxime (with a titre in 2-chloro-cyclo-hexanone-oxime of 77.5%) in 55 cc. of absolute ethanol was hydrogenated at room temperature and at atmospheric pressure in the presence of 0.93 g. of a catalyst containing 10% of Pd supported on activated carbon. After the absorption of the quantity of hydrogen required by the reaction was completed, the solution filtered from the catalyst, was evaporated completely under vacuum and the crystalline residue was neutralized at 0° C. by means of a saturated solution of sodium carbonate.

After repeated extractions with ethyl ether, drying of the ether extract over anhydrous sodium sulphate and subsequent evaporation, a crystalline residue of cyclo-hexanone-oxime weighing 3.45 g. having a M.P. of 86°–88° C. (yield=83%) was obtained.

Example 9

A solution of 14.4 g. of 2-chloro-cyclo-octanone-oxime and 8.07 g. of sulphuric acid at 100% concentration in 60 cc. of ethanol was hydrogenated at room temperature and at atmospheric pressure in the presence of 1.44 g. of a catalyst containing 10% of Pd supported on carbon. After the absorption of the quantity of hydrogen required by the reaction was completed, the solution was filtered from the catalyst, and the solvent was evaporated under vacuum. The oily residue was then neutralized at 0° C. with a saturated solution of sodium carbonate and then repeatedly extracted with chloroform. After drying of the chloroformic extracts over an anhydrous sodium sulphate and subsequent evaporation, a residue of 11.2 g. was obtained that after distillation yielded 9.51 g. of cyclo-octanone-oxime having a B.P. of 126° C. at 10 mm. Hg and a M.P. of 42° C.

The I.R. band of the product thus obtained turned out to be identical with that of the pure cyclo-octanone-oxime. The yield in distilled product was 82.1% of the theoretical value.

Example 10

A solution of 13.5 g. of 2-chloro-cyclo-octanone-oxime and of 2.73 g. of anhydrous hydrochloric acid in 80 cc. of glacial acetic acid was hydrogenated at room temperature and at atmospheric pressure in the presence of 1.89 g. of a catalyst containing 10% of Pd supported on carbon. After the absorption of the quantity of hydrogen required by the reaction was completed the catalyst was separated from the solution by filtration and the solvent was evaporated under vacuum. The residue thus obtained was treated in the same way as described in Example 9. Thus 8.8 g. of pure cyclo-octanone-oxime were obtained having a M.P. of from 41°–42° C. The yield in distilled product was 81% of the theoretical value.

Example 11

A solution of 20 g. of sulfate of the 2-chloro-cyclo-octanone-oxime, obtained in a similar manner as that described in Example 3 for 2-chloro-cyclo-hexanone-oxime sulfate, in 75 cc. of glacial acetic acid was hydrogenated at room temperature and atmospheric pressure in the presence of 1.8 g. of a catalyst containing 10% of Pd supported on carbon. After absorption of the quantity of hydrogen required by the reaction was completed, the solution filtered from the catalyst was treated, under stirring with 250 cc. of petroleum ether. The oily layer thus obtained was washed with some petroleum ether and treated at 0° C. with saturated solution of sodium carbonate until obtaining neutralization. After repeated extractions by chloroform, drying over anhydrous sodium sulphate and subsequent evaporation of the solvent, a residue of 9.07 g. was obtained, from which 8.46 g. of cyclo-octanone-oxime having a B.P. of 125°–126° C./10 mm. Hg and a M.P. of 40–42° C. were obtained by distillation at reduced pressure. The yield of the distilled product was 82% of the theoretical value.

Example 12

A solution of 19.3 g. of sulphate of the 2-chloro-cyclo-octanone-oxime in 75 cc. of methylene chloride was hydrogenated at room temperature and at atmospheric pressure in the presence of 1 g. of a catalyst containing 10% of Pd supported on carbon. After completion of the absorption of the quantity of hydrogen required by the reaction, the solution was filtered from the catalyst and then evaporated under vacuum. The residue thus obtained was neutralized with a saturated solution of sodium carbonate and subsequently extracted with ether.

After drying over anhydrous sodium sulphate after evaporation of the ether extracts, an oily residue of 9.3 g. was obtained which, when distilled under vacuum, yielded 7.68 g. (yield of 77.2% of the theoric) of pure cyclo-octanone-oxime having a M.P. of 41°–42° C.

Example 13

A solution of 23.6 g. of sulphate of 2-chloro-cyclo-octanone-oxime in 60 g. of ethanol was hydrogenated in an autoclave at room temperature and at a pressure of 10 atm. in the presence of 1.2 g. of a catalyst containing 10% of Pd supported on carbon. After absorption of the quality of hydrogen required by the reaction, the solution was filtered from the catalyst and the solvent was evaporated under vacuum. The residue thus obtained was neutralized at 0° C. with a concentrated solution of ammonia; after extracting with ethyl ether, drying over anhydrous sodium sulphate and subsequent evaporation, an oily residue of 11.3 g. was obtained from which, by distillation, 9.2 g. of cyclo-octanone-oxime having a B.P. of from 124°–126° C./10 mm. Hg and a M.P. of 41°–42° C., was obtained. The yield in distilled product was 76% of the theoretical value.

Example 14

A solution of 20 g. of sulphate of the 2-chloro-cyclo-dodecanone-oxime in 100 cc. of glacial acetic acid was hydrogenated at room temperature and atmospheric pressure in the presence of 1 g. of a catalyst containing 10% of Pd supported on carbon. On completion of the absorption of the quantity of hydrogen required by the reaction, the solution was filtered from the catalyst and diluted with water. A precipitate of 9.67 g. of cyclo-dodecanone-oxime having a M.P. of 120° C. was thus obtained, which, when recrystallized from light petrol, gave pure cyclo-dodecanone-oxime having a M.P. of 133–134° C. The I.R. band of the product thus obtained was identical with that of the pure cyclo-dodecanone-oxime. Yield=80.8% of the theoretical value.

We claim:

1. A process for preparing cyclo-hexanone-oxime, reacting 2-chlorocyclohexanone oxime in the presence of a strong acid selected from the group consisting of sulfuric acid, hydrochloric acid, phosphoric acid, benzenesulfonic acid and p-toluenesulfonic acid and of an organic polar solvent capable of dissolving the 2-chlorocyclohexanone oxime and its salt in said strong acid and selected from the group consisting of acetic acid, ethyl alcohol and methylene chloride with hydrogen in the presence of a hydrogenation catalyst comprising the element palladium, at a temperature in the range of between 0° C. and 70° C., the equivalent ratio between said strong acid and said 2-chlorocyclohexanone oxime being greater than 1:1, and separating said cyclohexanone oxime from the reaction mixture.

2. A process for preparing cyclohexanone oximes, comprising forming a solution of from about 25 to 50% by weight of a 2-chlorocyclohexanone oxime and an organic polar solvent capable of dissolving the 2-chlorocyclohexanone oxime and its salt in said strong acid and selected from the group consisting if acetic acid, ethyl alcohol and methylene chloride; reacting said solution with a strong acid selected from the group consisting of sulfuric acid, hydrochloric acid, phosphoric acid, benzenesulfonic acid and p-toluenesulfonic acid and hydrogen in the presence of a hydrogenation catalyst comprising the element palladium, at a temperature in the range between 0° C. and 70° C.; the equivalent ratio between said strong acid and said 2-chlorocyclohexanone oxime being greater than 1:1, and separating said cyclohexanone oxime from the reaction mixture.

3. A process for preparing cyclohexanone oxime, comprising salifying a 2-chlorocyclohexanone oxime with a strong acid selected from the group consisting of sulfuric acid, hydrochloric acid, phosphoric acid, benzenesulfonic acid and p-toluenesulfonic acid, the equivalent ratio between said strong acid and said 2-chlorocyclohexanone oxime being greater than 1:1; forming a solution from 25 to 50% by weight of the salified 2-chlorocycloalkanone oxime and an organic solvent selected from the group consisting of acetic acid, ethanol and methylene chloride; reacting said solution of strong acid salt with hydrogen in the presence of a hydrogenation catalyst comprising palladium at a temperature between about 0° C. and 70° C.; and separating said cyclohexanone oxime from the reaction mixture.

4. A process for preparing cyclohexanone oximes, comprising forming a solution from 25 to 50% by weight of a strong acid salt of a 2-chlorocyclohexanone oxime and an organic polar solvent capable of dissolving the 2-chlorocyclohexanone oxime and its salt in said strong acid and selected from the group consisting of acetic acid, ethyl alcohol and methylene chloride, reacting said strong acid salt solution with hydrogen in the presence of palladium hydrogenation catalyst at a temperature between 0° C. and 70° C.; and separating the cyclohexanone oxime from the reaction mixture.

References Cited

UNITED STATES PATENTS

| | | | |
|---|---|---|---|
| 2,420,392 | 5/1947 | Robertson | 260—566 |
| 2,907,793 | 10/1959 | Craig | 260—563 |

FLOYD D. HIGEL, *Primary Examiner.*